US010992611B2

(12) United States Patent
Qian et al.

(10) Patent No.: US 10,992,611 B2
(45) Date of Patent: Apr. 27, 2021

(54) TOPIC CLASSIFIED PRESENTATION FOR A MESSAGE IN A MESSAGE CLUSTER

(71) Applicant: HUAWEI TECHNOLOGIES CO., LTD., Shenzhen (CN)

(72) Inventors: Li Qian, Shenzhen (CN); Xiao Chen, Hong Kong (HK); Liangwei Wang, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 15/907,298

(22) Filed: Feb. 28, 2018

(65) Prior Publication Data

US 2018/0191649 A1 Jul. 5, 2018

Related U.S. Application Data

(63) Continuation of application No. PCT/CN2016/079469, filed on Apr. 15, 2016.

(51) Int. Cl.
*G06F 15/16* (2006.01)
*H04L 12/58* (2006.01)
*G06F 16/35* (2019.01)
*H04L 29/06* (2006.01)

(52) U.S. Cl.
CPC .......... *H04L 51/046* (2013.01); *G06F 16/353* (2019.01); *G06F 16/358* (2019.01); *H04L 51/16* (2013.01); *H04L 51/04* (2013.01); *H04L 67/42* (2013.01)

(58) Field of Classification Search
CPC ....... H04L 51/14; H04L 51/046; H04L 51/16; G06F 16/353; G06F 16/358; G06F 17/2785

USPC ................. 709/206, 207, 217, 219
See application file for complete search history.

(56) References Cited

U.S. PATENT DOCUMENTS 7,159,011 B1  1/2007 Knight et al.
7,165,213 B1*  1/2007 Busey ................. H04L 12/1813
                                          709/202
2006/0080161 A1*  4/2006 Arnett .................... G06F 21/31
                                          705/7.31
(Continued)

FOREIGN PATENT DOCUMENTS

CN       101604320 A    12/2009
CN       102609460 A    7/2012
(Continued)

OTHER PUBLICATIONS

Fabrizio Antonelli, et al., "A Rule Based Approach to Message Board Topics Classification", Advances in Multimedia Information Systems Lecture Notes in Computer Science; LNCS, Springer Berlin, D, XP019018436, pp. 33-48, Jan. 1, 2005.

*Primary Examiner* — Kaylee J Huang
(74) *Attorney, Agent, or Firm* — Kilpatrick Townsend & Stockton LLP

(57) ABSTRACT

A message presenting method, device, and system relating to the field of computer technologies is provided. In various embodiments, M number of messages entered in a message cluster are classified under N number of classification topics according to a preset classification rule. The N number of classification topics and a target message are sent to a client so that the client can present the N number of classification topics to a user.

11 Claims, 10 Drawing Sheets

(56) References Cited

U.S. PATENT DOCUMENTS

| | | | |
|---|---|---|---|
| 2007/0239755 A1* | 10/2007 | Mahoney | G06Q 10/107 |
| 2008/0086703 A1* | 4/2008 | Flynt | G06F 3/0482 |
| | | | 715/853 |
| 2010/0312769 A1* | 12/2010 | Bailey | G06F 16/285 |
| | | | 707/740 |
| 2015/0100527 A1 | 4/2015 | Ryan et al. | |
| 2015/0177970 A1* | 6/2015 | Choi | H04L 12/1895 |
| | | | 715/752 |
| 2016/0173433 A1* | 6/2016 | Bastide | G06F 16/122 |
| | | | 709/206 |
| 2016/0315902 A1* | 10/2016 | Silva | H04W 4/21 |
| 2016/0328363 A1* | 11/2016 | Bastide | G06Q 10/107 |
| 2017/0034277 A1* | 2/2017 | Jackson | H04L 67/12 |
| 2017/0131864 A1* | 5/2017 | Edgar | G06F 3/0485 |
| 2017/0163586 A1* | 6/2017 | Chalamalasetti | H04L 51/22 |
| 2017/0262509 A1* | 9/2017 | Khanna | G06F 16/9535 |

FOREIGN PATENT DOCUMENTS

| | | |
|---|---|---|
| CN | 103051522 A | 4/2013 |
| CN | 103490989 A | 1/2014 |
| JP | 2016021178 A | 2/2016 |

\* cited by examiner

| | |
|---|---|
| Zhang: Have you seen President Xi? | 1 |
| Li: He is attending the press conference with Ma Yingjiu. | 0 |
| Wang: They are watching TV in the living room. | 0 |
| Li: Change to another topic. The two-child policy is put into effect. | 1 |
| Wang: I discussed this with my wife last night. | 0 |
| Wang: My wife said she would never have another child with me. | 0 |

… (1) TOPIC CLASSIFIED PRESENTATION FOR A MESSAGE IN A MESSAGE CLUSTER

CROSS-REFERENCE TO RELATED APPLICATIONS

This application is a continuation of International Application No. PCT/CN2016/079469, filed on Apr. 15, 2016, the disclosure of which is hereby incorporated by reference in its entirety.

TECHNICAL FIELD

The present invention relates to the field of computer technologies, and in particular, to a message presenting method, device, and system.

BACKGROUND

At present, group chat is supported during communication using instant messaging software. In a general case, a large quantity of conversation messages can be gathered in a group with highly active users within a short period of time, and these conversation messages are presented in chronological order of publication. When facing a large quantity of group messages, a user finds it difficult to rapidly focus on conversation messages of a topic that interests the user among the complex messages.

In the prior art, to enable a user to rapidly focus on conversation messages that interest the user among a large quantity of conversation messages, a keyword can be used to locate conversation messages of a topic that interests the user. However, using this method, the user cannot obtain a full discussion picture of the conversation messages of the topic that interests the user, but can obtain only conversation messages including the keyword.

To sum up, the current instant message presenting manner is relatively monotonous and cannot satisfy a user's requirement.

SUMMARY

The present invention provides a message presenting method and apparatus, so as to resolve a problem in the prior art that an instant message presenting manner is relatively monotonous.

According to a first aspect, a message presenting method is provided, including:

classifying, by a server for a message cluster and according to a preset classification rule, M number of messages entered in the message cluster by at least one user, under N number of classification topics, where M and N are positive integers, and M≥N; and sending the N number of classification topics and a target message to a client, where the target message is a message classified under at least one of the N number of classification topics.

In an embodiment of the present invention, with regard to a message cluster, M number of messages entered in the message cluster by at least one user can be classified under N number of classification topics according to a preset classification rule, and the N number of classification topics and a target message can be sent to a client, so that the client can present the N number of classification topics to a user. This diversifies the message presenting manner, and enables the user to directly perceive a full picture of content of messages discussed in the message cluster.

Based on the first aspect, optionally, a specific implementation manner of the classifying, by a server, M number of messages under N number of classification topics is:

separately determining, by the server, classification weight values that each of the M number of messages is classified under preset K classification topics, where K is a positive integer, and K≥N; dividing the M number of messages into P number of groups according to a message content classification rule, to obtain P number message groups; and classifying, for the $n^{th}$ message group of the P number message groups, the $n^{th}$ message group under a first classification topic, where a message having the largest classification weight value in the $n^{th}$ message group is a first message, a classification weight value that the first message is classified under the first classification topic is the largest, and the first classification topic is one of the N number of classification topics.

In this embodiment of the present invention, by using the foregoing manner, M number of messages are classified under N number of classification topics, so that the technical solution is simple and easy to implement.

Based on the first aspect, optionally, there are at least two messages having the largest classification weight value in the $n^{th}$ message group, and the first message is an earliest-entered message of the at least two messages.

When there are at least two messages having the largest classification weight value in the $n^{th}$ message group, a first message is an earliest-entered message. Therefore, a classification topic under which a message group is classified that is determined according to the first message is more accurate.

Based on the first aspect, an embodiment of the present invention provides a manner for triggering the server to send the N number of classification topics to the client for presenting; and optionally, before sending the N number of classification topics to the client for presenting, the server receives a message classification display request sent by the client for the message cluster.

Based on the first aspect, an embodiment of the present invention further provides another manner for triggering the server to send the N number of classification topics to the client for presenting; and optionally, before sending the N number of classification topics to the client for presenting, the server determines that a quantity of messages entered in the message cluster exceeds a given threshold.

Based on the first aspect, optionally, the target message is messages classified separately under the N number of classification topics; and the server sends the messages classified separately under the N number of classification topics to the client.

Because the server directly sends the messages classified separately under the N number of classification topics to the client, a latency time for a user to view a target message by using the client is shortened.

Based on the first aspect, optionally, the target message is a message classified under a target classification topic, and the target classification topic is a classification topic under which a message that a message presenting request sent by the client to the server requests sending is classified; and the server sends the message classified under the target classification topic to the client after receiving the message presenting request sent by the client, where the message presenting request is used to request the server to send the message classified under the target classification topic to the client.

The server sends a message classified under a target classification topic to the client when receiving a message presenting request. Therefore, although a latency for the user to view the target message increases, occupied memory space of the client is reduced.

Based on the first aspect, optionally, the message presenting request further includes a restriction on a presenting request message; and the server sends a message that satisfies the restriction and that is classified under the target classification topic to the client.

By applying a restriction, a message satisfying the restriction can further be picked out. This improves efficiency that the user views the message classified under the target classification topic.

Based on the first aspect, optionally, the server further sends a quantity of messages classified under each of the N number of classification topics to the client.

The server further sends a quantity of messages classified under the N number of classification topics to the client for presenting, so that the user can have a direct perception about the quantity of messages included under each classification topic.

According to a second aspect, a message presenting method is provided, including:

receiving and presenting, by a client, N number of classification topics sent by a server for a message cluster, where the N number of classification topics are obtained by the server by classifying the M number of messages according to a preset classification rule, M and N are positive integers, and M≥N; receiving a message presenting request, and determining a target classification topic, where the target classification topic is one of the presented N number of classification topics, and the message presenting request is used to request that a message classified under the target classification topic is presented; and obtaining and presenting the message classified under the target classification topic.

In this embodiment of the present invention, a client can present, with regard to each message cluster, N number of classification topics and a target message in the message cluster. This diversifies the message presenting manner, and enables a user to directly perceive a full picture of content of messages discussed in the message cluster.

Based on the second aspect, optionally, the client receives messages classified separately under the N number of classification topics and sent by the server; and the client reads the message classified under the target classification topic from the received messages classified separately under the N number of classification topics.

Because the server directly sends the messages classified separately under the N number of classification topics to the client, a latency time for a user to view a target message by using the client is shortened.

Based on the second aspect, optionally, the message presenting request further includes a restriction on a presenting request message; and the client reads a message that satisfies the restriction and that is classified under the target classification topic, from the received messages classified separately under the N number of classification topics.

The client can read a restriction-satisfying message that is further picked out by applying a restriction. This improves efficiency that the user views the message classified under the target classification topic.

Based on the second aspect, optionally, the client sends the message presenting request to the server, to instruct the server to send the message classified under the target classification topic to the client; and receives the message classified under the target classification topic and sent by the server.

The client receives and presents the message classified under the target classification topic and sent by the server, after sending a message presenting request to the server. Therefore, although a delay that the user views the target message increases, occupied memory space of the client is reduced.

Based on the second aspect, optionally, the message presenting request further includes a restriction on a presenting request message; and the client receives a message that satisfies the restriction and that is classified under the selected classification topic and sent by the server.

The client can read a restriction-satisfying message that is further picked out by applying a restriction. This improves efficiency that the user views the message classified under the target classification topic.

Based on the second aspect, optionally, before the presenting, by a client, N number of classification topics sent by a server for a message cluster, the client sends a message classification display request for the message cluster to be server.

A classification topic is presented on the client only after the client sends a message classification display request with regard to a message cluster to the server. In this way, the user can perform corresponding settings according to the user's own requirement, and therefore, user experience is improved.

Based on the second aspect, optionally, a manner of the presenting, by the client, the message classified under the target classification topic includes: displaying, by the client, a dialog box in correspondence to the target classification topic, and presenting, in the displayed dialog box, the message classified under the target classification topic; or presenting, by the client, the message classified under the target classification topic, in a preset unoccupied region of a dialog box to which the target classification topic belongs.

The message classified under the target classification topic is displayed in a dialog box displayed in correspondence to the target classification topic or in a preset unoccupied region of a dialog box to which the target classification topic belongs. In this way, message presenting is clearer.

According to a third aspect, a message presenting method is provided, including:

classifying, by a client for a message cluster and according to a preset classification rule, M local messages in the message cluster that are temporarily stored in the client, under N number of classification topics, where M and N are positive integers, and M≥N; presenting the N number of classification topics; determining, after receiving a message presenting request, a target classification topic according to the received message presenting request, where the target classification topic is one of the presented N number of classification topics, and the message presenting request is used to request that a local message classified under the target classification topic is presented; and obtaining the local message classified under the target classification topic from the M local messages temporarily stored in the client, and presenting the local message classified under the target classification topic.

In this embodiment of the present invention, a client can present, with respect to each message cluster, N number of classification topics and a local message classified under a target classification topic that are in the message cluster. This diversifies the message presenting manner, and enables a user to directly perceive a full picture of content of local messages discussed in the message cluster.

Based on the third aspect, an embodiment of the present invention further provides a manner for triggering the server to send the N number of classification topics to the client for presenting. Optionally, before the client classifies the M local messages in the message cluster under the N number of classification topics, the client receives a message classification display request for the message cluster.

Based on the third aspect, an embodiment of the present invention further provides another manner for triggering the server to send the N number of classification topics to the client for presenting. Optionally, before the client classifies the M local messages in the message cluster under the N number of classification topics, the client determines that a quantity of local messages temporarily stored in the message cluster exceeds a given threshold.

Based on the third aspect, optionally, a specific implementation manner of the classifying, by a client, M local messages under N number of classification topics is:

determining, by the client, classification weight values that each of the M local messages is classified under preset K classification topics respectively, where K is a positive integer, and K≥N; dividing the M local messages into P number of groups according to a message content classification rule, to obtain P number message groups; and classifying, for the $n^{th}$ message group of the P number message groups, the $n^{th}$ message group under a first classification topic, where a local message having the largest classification weight value in the $n^{th}$ message group is a first message, a classification weight value that the first message is classified under the first classification topic is the largest, and the first classification topic is one of the N number of classification topics.

In this embodiment of the present invention, by using the foregoing manner, M local messages are classified under the N number of classification topics, so that the technical solution is simple and easy to implement.

Based on the third aspect, optionally, there are at least two messages having the largest classification weight value in the $n^{th}$ message group, and the first message is an earliest-entered message of the at least two messages.

When there are at least two messages having the largest classification weight value in the $n^{th}$ message group, a first message is an earliest-entered message. Therefore, a classification topic under which a message group is classified that is determined according to the first message is more accurate.

Based on the third aspect, optionally, the presenting, by the client, the local message classified under the target classification topic includes: displaying, by the client, a dialog box in correspondence to the target classification topic, and presenting, in the displayed dialog box, the local message classified under the target classification topic; or presenting, by the client, the local message classified under the target classification topic, in a preset unoccupied region of a dialog box to which the target classification topic belongs.

A local message classified under the target classification topic is displayed in a dialog box displayed in correspondence to the target classification topic or in a preset unoccupied region of a dialog box to which the target classification topic belongs. In this way, presenting of a local message is clearer.

Based on the third aspect, optionally, the message presenting request further includes a restriction on a presenting-requested local message; and the client obtains, from the M local messages temporarily stored in the client, a local message that satisfies the restriction and that is classified under the target classification topic, and presents the local message that satisfies the restriction and that is classified under the target classification topic.

The client can read a restriction-satisfying message that is further picked out by applying a restriction. This improves efficiency that the user views the message classified under the target classification topic.

According to a fourth aspect, a message presenting server is provided, including: a processing unit and a transceiver unit. The processing unit is configured to classify, for a message cluster and according to a preset classification rule, M number of messages entered in the message cluster by at least one user, under N number of classification topics, where M and N are positive integers, and M≥N; and the transceiver unit is configured to send to a client a target message and the N number of classification topics obtained through classification by the processing unit, where the target message is a message classified under at least one of the N number of classification topics.

Based on the fourth aspect, optionally, the processing unit is specifically configured to: separately determine classification weight values that each of the M number of messages is classified under preset K classification topics, where K is a positive integer, and K≥N; divide the M number of messages into P number of groups according to a message content classification rule, to obtain P number message groups; and classify, for the $n^{th}$ message group of the P number message groups, the $n^{th}$ message group under a first classification topic, where a message having the largest classification weight value in the $n^{th}$ message group is a first message, a classification weight value that the first message is classified under the first classification topic is the largest, and the first classification topic is one of the N number of classification topics.

Based on the fourth aspect, optionally, there are at least two messages having the largest classification weight value in the $n^{th}$ message group, and the first message is an earliest-entered message of the at least two messages.

Based on the fourth aspect, optionally, the transceiver unit is further configured to receive a message classification display request sent by the client for the message cluster, before sending the N number of classification topics obtained through classification by the processing unit to the client for presenting.

Based on the fourth aspect, optionally, the processing unit is further configured to determine that a quantity of messages entered in the message cluster exceeds a given threshold, before the transceiver unit sends the N number of classification topics obtained through classification by the processing unit to the client for presenting.

Based on the fourth aspect, optionally, the target message is messages classified separately under the N number of classification topics; and the transceiver unit is specifically configured to send the messages classified separately under the N number of classification topics to the client.

Based on the fourth aspect, optionally, the target message is a message classified under the target classification topic, and the target classification topic is a classification topic under which a message that a message presenting request sent by the client to the transceiver unit requests sending is classified; and the transceiver unit is specifically configured to: send the message classified under the target classification topic to the client after receiving the message presenting request sent by the client, where the message presenting request is used to request that the processing unit sends the message classified under the target classification topic to the client by using the transceiver unit.

Based on the fourth aspect, optionally, the message presenting request further includes a restriction on a presenting request message; and the transceiver unit is specifically configured to send to the client a message that satisfies the restriction and that is classified under the target classification topic and determined by the processing unit.

Based on the fourth aspect, optionally, the transceiver unit is further configured to send a quantity of messages classified under each of the N number of classification topics to the client.

A fifth aspect provides a message presenting client, including a transceiver unit, a display unit, and a processing unit. The transceiver unit is configured to receive N number of classification topics sent by the server for the message cluster, where the N number of classification topics are obtained by the server by classifying the M number of messages according to a preset classification rule, M and N are positive integers, and M≥N; and the display unit is configured to present the N number of classification topics received by the receiving unit; where the transceiver unit is further configured to receive a message presenting request, where the message presenting request is used to request that a message classified under the target classification topic is presented, and the target classification topic is one of the presented N number of classification topics; and the processing unit is configured to determine the target classification topic according to the message presenting request received by the transceiver unit; where the display unit is further configured to obtain and present the message classified under the target classification topic that is determined by the processing unit.

Based on the fifth aspect, optionally, the transceiver unit is further configured to receive messages classified separately under the N number of classification topics and sent by the server; and the display unit is specifically configured to read the message classified under the target classification topic, from the messages classified separately under the N number of classification topics and received by the transceiver unit.

Based on the fifth aspect, optionally, the message presenting request further includes a restriction on a presenting request message; and the display unit is specifically configured to read a message that satisfies the restriction and that is classified under the target classification topic, from the messages classified separately under the N number of classification topics and received by the transceiver unit.

Based on the fifth aspect, optionally, the transceiver unit is specifically configured to: send the message presenting request to the server, to instruct the server to send the message classified under the target classification topic to the client; and receive the message classified under the target classification topic and sent by the server; and the display unit is specifically configured to obtain the message classified under the target classification topic and received by the transceiver unit.

Based on the fifth aspect, optionally, the message presenting request further includes a restriction on a presenting request message; and the transceiver unit is specifically configured to receive a message that satisfies the restriction and that is classified under the target classification topic and sent by the server.

Based on the fifth aspect, optionally, the transceiver unit is further configured to send a message classification display request for the message cluster to the server, before the display unit presents the N number of classification topics sent by the server for the message cluster.

Based on the fifth aspect, optionally, the display unit is specifically configured to: display a dialog box in correspondence to the target classification topic, and present, in the displayed dialog box, the message classified under the target classification topic; or present the message classified under the target classification topic, in a preset unoccupied region of a dialog box to which the target classification topic belongs.

A sixth aspect provides a message presenting system, including the server according to any one of embodiments of the present invention and the client according to any one of embodiments of the present invention.

A seventh aspect provides a message presenting client, including a processing unit, a display unit, and a transceiver unit. The processing unit is configured to classify, for a message cluster and according to a preset classification rule, M local messages temporarily stored in the message cluster, under N number of classification topics, where M and N are positive integers, and M≥N; a display unit is configured to present the N number of classification topics obtained through classification by the processing unit; and the transceiver unit is configured to receive a message presenting request, where the message presenting request is used to request that a local message classified under a target classification topic is presented, and the target classification topic is one of the presented N number of classification topics; where the processing unit is further configured to determine the target classification topic according to the message presenting request received by the transceiver unit; and the display unit is further configured to: obtain the local message classified under the target classification topic from the M temporarily-stored local messages, and present the local message classified under the target classification topic.

Based on the seventh aspect, optionally, the transceiver unit is further configured to receive a message classification display request for the message cluster before the processing unit classifies the M local messages in the message cluster under the N number of classification topics.

Based on the seventh aspect, optionally, the processing unit is further configured to determine that a quantity of local messages temporarily stored in the message cluster exceeds a given threshold, before classifying the M local messages in the message cluster under the N number of classification topics.

Based on the seventh aspect, optionally, the processing unit is specifically configured to: determine classification weight values that each of the M local messages is classified under preset K classification topics respectively, where K is a positive integer, and K≥N; divide the M local messages into P number of groups according to a message content classification rule, to obtain P number message groups; and classify, for the $n^{th}$ message group of the P number message groups, the $n^{th}$ message group under a first classification topic, where a local message having the largest classification weight value in the $n^{th}$ message group is a first message, a classification weight value that the first message is classified under the first classification topic is the largest, and the first classification topic is one of the N number of classification topics.

Based on the seventh aspect, optionally, there are at least two messages having the largest classification weight value in the $n^{th}$ message group, and the first message is an earliest-entered message of the at least two messages.

Based on the seventh aspect, optionally, the display unit is specifically configured to: display a dialog box in correspondence to the target classification topic, and present, in the displayed dialog box, the local message classified under the target classification topic; or present the local message classified under the target classification topic, in a preset unoccupied region of a dialog box to which the target classification topic belongs.

Based on the seventh aspect, optionally, the message presenting request further includes a restriction on a presenting-requested local message; and the display unit is specifically configured to: obtain, from the M local messages temporarily stored in the client, a local message that satisfies the restriction and that is classified under the target classification topic, and present the local message that satisfies the restriction and that is classified under the target classification topic.

DESCRIPTION OF EMBODIMENTS

To make the objectives, technical solutions, and advantages of the embodiments of the present invention clearer, the following further describes the embodiments of the present invention in detail with reference to the accompanying drawings in this specification.

The embodiments of the present invention are applied to an instant messaging application, such as Tencent QQ, WeChat, and Weibo.

Figure 1:
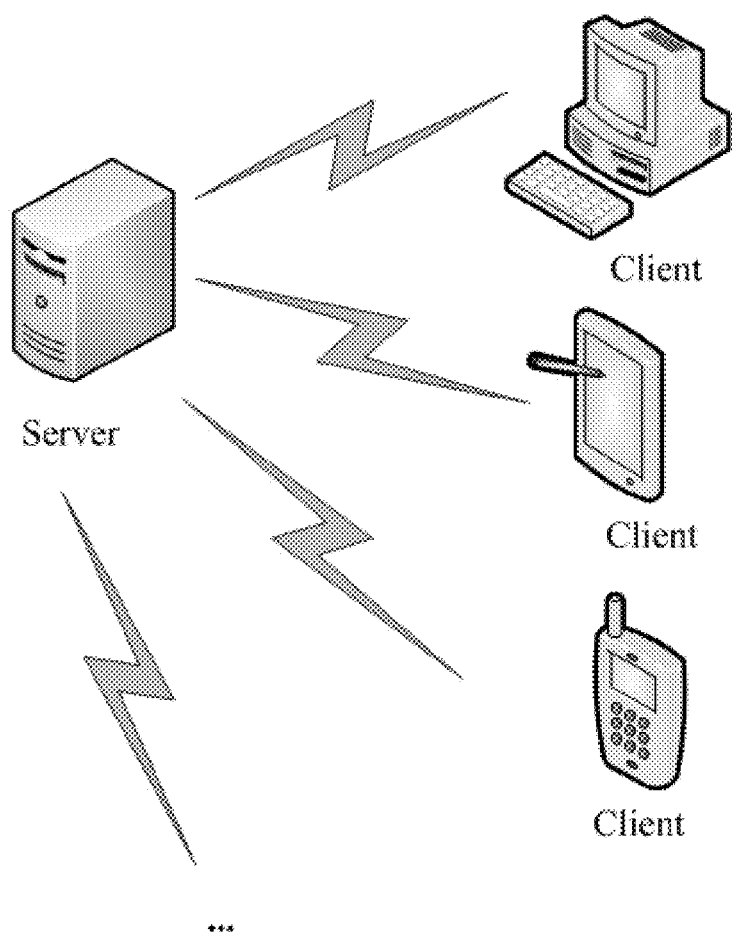
FIG. 1 is a network architecture diagram applied to an embodiment of the present invention.

Specifically, as shown in FIG. 1, a network architecture of an application scenario includes a server and a client. The client is an application installed on a terminal. The terminal sends, by using the client, to the server a request or information entered by a user. The server feeds back, by using the client installed on the terminal, to the user information requested by the user.

The terminal on which the client is installed may be an electronic product on which the client can be installed, such as a mobile phone, a tablet computer, a laptop computer, or a desktop computer.

Figure 2:
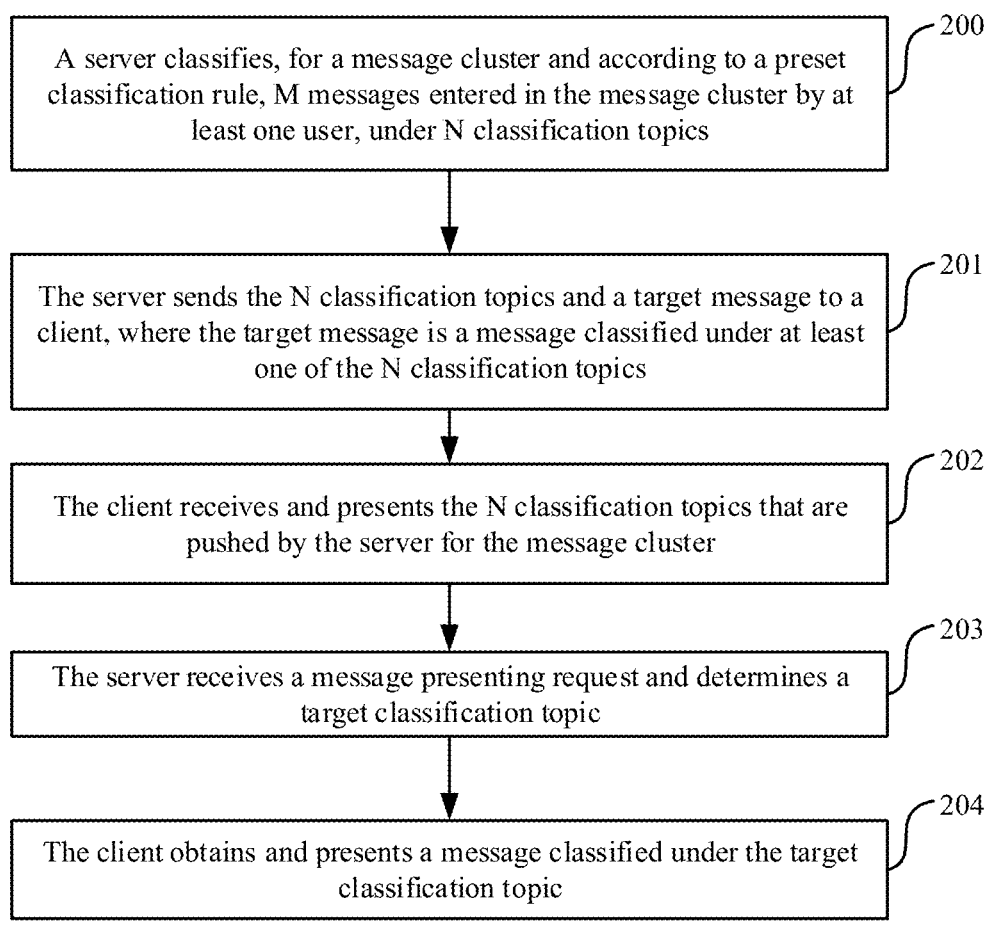
FIG. 2 is a schematic flowchart of a message presenting method according to an embodiment of the present invention.

Specifically, when a message entered in a message cluster by at least one user is classified by using the server, as shown in FIG. 2, a message presenting method in an embodiment of the present invention includes the following steps.

Step 200. The server classifies, for a message cluster and according to a preset classification rule, M number of messages entered in the message cluster by the at least one user, under N number of classification topics, where M and N are positive integers, and M≥N.

It should be noted that after receiving the M number of messages entered in the message cluster by the at least one user and reported by the client, the server directly classifies the M number of messages under the N number of classification topics; or the server is triggered before step 200 by a message classification display request sent by the client to the server for the message cluster, to classify messages in the message cluster. For example, a classification display button corresponding to each message cluster is provided on the client, and when the user sets the classification display button to on, the client sends a message classification display request to the server.

In addition, this embodiment of the present invention further provides a method for triggering the server to classify, under different classification topics, the messages in the message cluster that are entered in the message cluster by the at least one user: The server determines that the messages entered in the message cluster exceed a given threshold. For example, if a threshold of a message cluster 1 is set to 50, the server classifies messages in the message cluster 1 when the $51^{st}$ message is received in the message cluster 1. If a threshold of a message cluster 2 is set to 51, the server classifies messages in the message cluster 2 when the $52^{nd}$ message is received in the message cluster 2. In addition, if a threshold of a message cluster 3 is set to 0, the server classifies messages in the message cluster 3 whenever a message is received in the message cluster 3.

In addition, it should be noted that the preset classification rule in step 200 may be a standard classifier algorithm in combination with a common sequence labeling model. The standard classifier algorithm is, for example, a simple naive Bayes classifier algorithm. The common sequence labeling model is, for example, a hidden Markov model or a conditional random field model.

Specifically, this may be implemented in the following manner: The server separately determines classification weight values that each of the M number of messages is classified under preset K classification topics, where K is a positive integer, and K≥N; divides the M number of messages into P number of groups according to a message content classification rule, to obtain P number message groups; and classifies, for the $n^{th}$ message group of the P number message groups, the $n^{th}$ message group under a first classification topic, where a message having the largest classification weight value in the $n^{th}$ message group is a first message, a classification weight value that the first message is classified under the first classification topic is the largest, and the first classification topic is one of the N number of classification topics.

It should be understood that in this embodiment of the present invention, the separately determining classification weight values that each of the M number of messages is classified under preset K classification topics may be implemented by using a simple naive Bayes classifier algorithm or another classifier algorithm.

The preset classification topics may be set on the server in advance by an administrator. To update a topic on the server in real time, a preset algorithm may be used to obtain a classification topic from a network. Specifically, the classification topic may be a general topic, for example, a topic related to culture, economy, politics, and people's livelihood, or a time-based topic, for example, Tianjin port explosion, the 18$^{th}$ National Congress of the Communist Party of China, and Paris terrorist attacks.

It should be understood that the server may obtain, as a general topic, a classification topic from a classification list on a preset website (for example, a classification-based news website) by using a web crawler technology. The server may obtain post text data, reply data, and author's social network data from a social medium (for example, Weibo) by using a network crawler technology, considers a text of and replies to each post crawled from the social medium as a document, performs clustering by using a text clustering technology, and determines whether documents in each classification basically belong to one classification. If most documents do not belong to one classification, a clustering parameter may be adjusted, and clustering is performed again until an acceptable clustering result is obtained. If the clustering result is acceptable, a classification name is designated for each classification as a time-based topic. In addition, for a social medium similar to Weibo on which "#" can be used to mark a post topic in a post, a topic of a sample document for each classification may be directly used.

It should be noted that in actual application, a time-based topic collection may be updated periodically. A time-based topic has a short lifespan, and therefore, during each update, only social media data within a preset period of time (for example, the last three months) needs to be obtained for clustering.

Specifically, in step 200, the server determines a feature vector for each message, determines a topic classification weight value for each message according to the determined feature vector, and trains the sequence labeling model (common sequence labeling models are, for example, hidden Markov models and conditional random field models) according to a message content classification rule, for example, training set data, to learn message classification, so as to obtain P number message groups. A conditional random field model is used as an example. Features used in the model may include but are not limited to the following features:

whether a current message and a previous message have a same highest-weight topic;

whether there is a same topic among three highest-weight topics of the current message and three highest-weight topics of the previous message;

an interval of time between the current message and the previous message;

whether there is an obvious topic change feature in the current message, for example, "change to another topic" in the following example;

whether the current message and the previous message have a same publisher; and whether the current message @ a publisher of the previous message.

Using the trained sequence labeling model to label messages in the message cluster can classify a current dialogue sequence to obtain P number message groups. Specifically, the obtained to-be-classified messages in the message cluster are labeled, to obtain message sequences labeled with 0 and 1, that is, a dialogue sequence labeling training set. 1 represents starting a new topic, and 0 represents continuing with a current topic.

The server determines, with regard to each message group, a classification topic under which the message group is classified.

Figures 3, 4A:
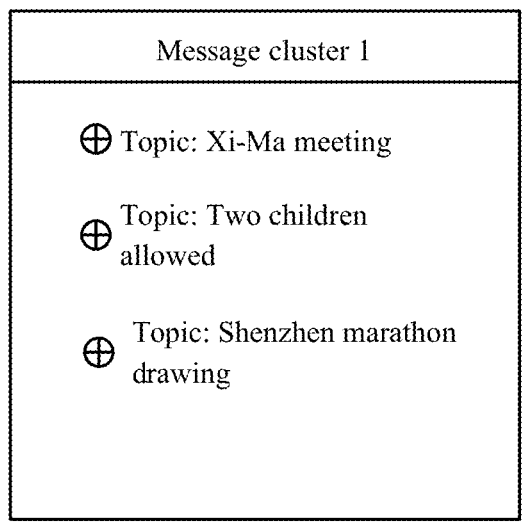
FIG. 3 is a schematic diagram of messages in a cluster.
FIG. 4(a) and FIG. 4(b) are each a schematic diagram of a classification topic presenting manner according to an embodiment of the present invention.

Messages in the message cluster 1 in FIG. 3 are used as an example for description.

It is assumed that a classification weight value that a message "Zhang: Have you seen President Xi?" in the message cluster 1 is classified under a classification topic of "Xi-Ma meeting" is 70%; a classification weight value that a message "Li: He is attending the press conference with Ma Yingjiu." is classified under the classification topic of "Xi-Ma meeting" is 80%; a classification weight value that a message "Wang: They are watching TV in the living room." is classified under the classification topic of "Xi-Ma meeting" is 50%, and a classification weight value that the message "Wang: They are watching TV in the living room." is classified under a classification topic of "others" is 50%; a classification weight value that a message "Li: Change to another topic. The two-child policy is put into effect." is classified under a classification topic of "two children allowed" is 90%; a classification weight value that a message "Wang: I discussed this with my wife last night." is classified under the classification topic of "two children allowed" is 60%, and a classification weight value that the message "Wang: I discussed this with my wife last night." is classified under the classification topic of "others" is 30%; and a classification weight value that a message "Wang: My wife said she would never have another child with me." is classified under the classification topic of "two children allowed" is 80%.

According to the classification weight values that the messages are classified under the classification topics, based on the foregoing model, it can be determined that the messages "Zhang: Have you seen President Xi?", "Li: He is attending the press conference with Ma Yingjiu.", and "Wang: They are watching TV in the living room." are classified under the classification topic of "Xi-Ma meeting"; and the messages "Li: Change to another topic. The two-child policy is put into effect.", "Wang: I discussed this with my wife last night.", and "Wang: My wife said she would never have another child with me." are classified under the classification topic of "two children allowed".

It should be noted that in this embodiment of the present invention, messages in a message cluster may first be classified to obtain at least one message group, then a classification weight value by which each message is classified under a classification topic is determined, and finally a classification topic under which each message group is classified is determined. A message classification method may alternatively be training a sequence labeling model, and features used in the model may not include that related to the topic classification weight.

Optionally, there are at least two messages having the largest classification weight value in the n$^{th}$ message group, and the first message is an earliest-entered message of the at least two messages.

For example, the second message group includes the messages "Li: He is attending the press conference with Ma Yingjiu." and "Wang: They are watching TV in the living room.", with the classification weight value that the message "Li: He is attending the press conference with Ma Yingjiu." is classified under the classification topic of "Xi-Ma meeting" being 90%, and the classification weight value that the message "Wang: They are watching TV in the living room." is classified under the classification topic of "others" being 90%. Li publishes the message earlier than Wang, and therefore, the second message group is classified under the classification topic of "Xi-Ma meeting".

Step 201. The server sends the N number of classification topics and a target message to a client, where the target message is a message classified under at least one of the N number of classification topics.

In an embodiment of the present invention, a manner of sending the N number of classification topics and the target message is:

the server sends the N number of classification topics and messages classified separately under the N number of classification topics to the client, where the target message is the messages classified separately under the N number of classification topics.

In an embodiment of the present invention, another manner of sending the N number of classification topics and the target message is provided:

the server first sends the N number of classification topics to the client, then performs step 202, and after receiving a message presenting request sent by the client, sends the target message to the client for presenting, where the target message is a message classified under a target classification topic, and the target classification topic is a classification topic under which a message that the message presenting request sent by the client to the server requests sending is classified.

For example, the N number of classification topics include "politics", "economy", and "culture", and the server sends "politics", "economy", and "culture" to the client for presenting. When a user selects "culture", the client sends a message presenting request to the server, and the message presenting request is used to request that a message classified under "culture" is sent. After receiving the message presenting request, the server sends the message classified under "culture" to the client for presenting.

Step 202. The client receives and presents the N number of classification topics that are sent by the server for the message cluster.

For example, the message cluster 1 includes three classification topics "Xi-Ma meeting", "Two children allowed", and "Shenzhen marathon drawing", and a display effect of presenting them on the client may be shown in FIG. 4(a).

Figure 4B:
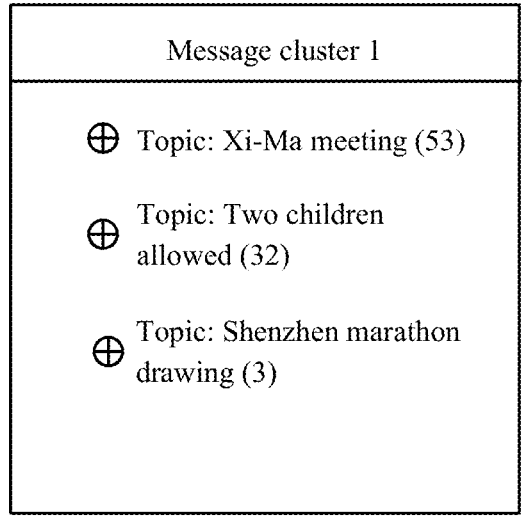

To give the user a more visual view of a quantity of messages under each classification topic, optionally, the server sends quantities of messages classified under different classification topics to the client to be presented in correspondence to the different classification topics. A presenting manner may be shown in FIG. 4(b).

Step 203. The server receives a message presenting request and determines a target classification topic.

The target classification topic is a classification topic of a message requested to be presented according to the message presenting request triggered by the user.

Step 204. The client obtains and presents a message classified under the target classification topic.

It should be noted that when the server sends the N number of classification topics and the messages classified separately under the N number of classification topics to the client, the client reads the message classified under the target classification topic from the received messages classified separately under the N number of classification topics.

When sending the N number of classification topics to the client, the server does not send the messages classified separately under the N number of classification topics to the client at the same time. The client sends a message presenting request to the server, and obtains the message classified under the target classification topic by receiving the message classified under the target classification topic and sent by the server.

A manner for presenting, by the client, the message under the target classification topic includes: displaying a dialog box in correspondence to the target classification topic, and presenting, in the displayed dialog box, the message classified under the target classification topic and sent by the server; or presenting, by the client, the message classified under the target classification topic and sent by the server, in a preset unoccupied region of a dialog box to which the target classification topic belongs.

Figure 5A:
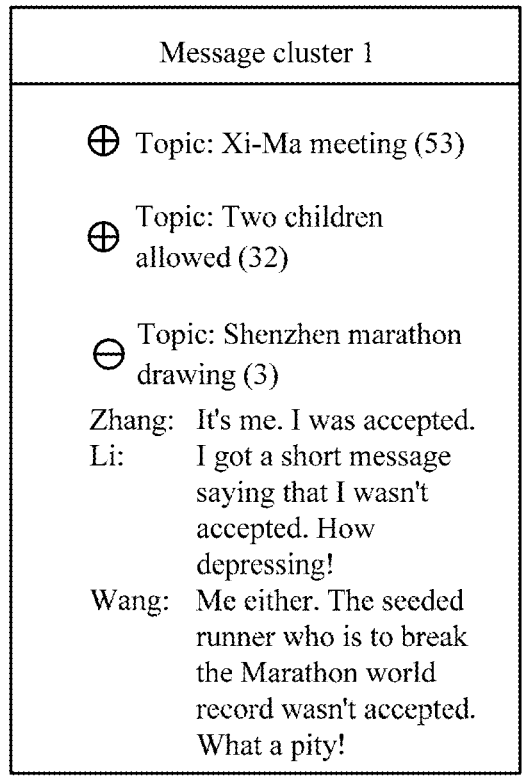
FIG. 5(a), FIG. 5(b), and FIG. 5(c) are each a schematic diagram of a presenting manner for a message under a selected classification topic according to an embodiment of the present invention.
Figure 5B:
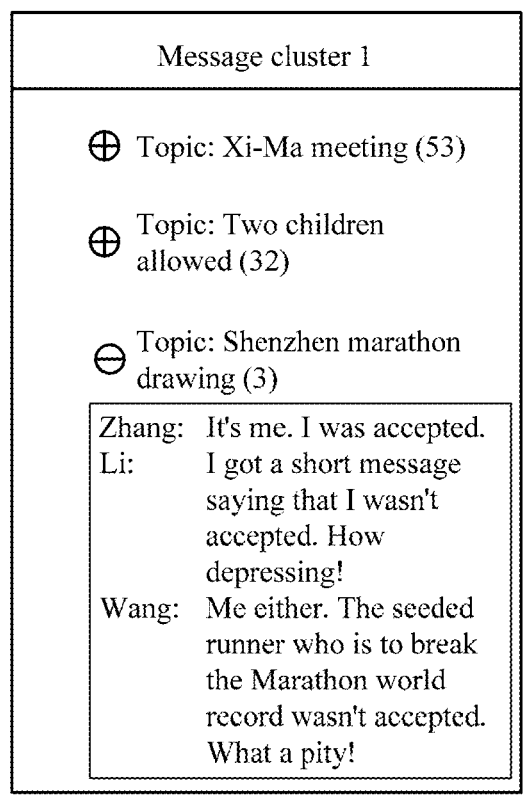
Figure 5C:
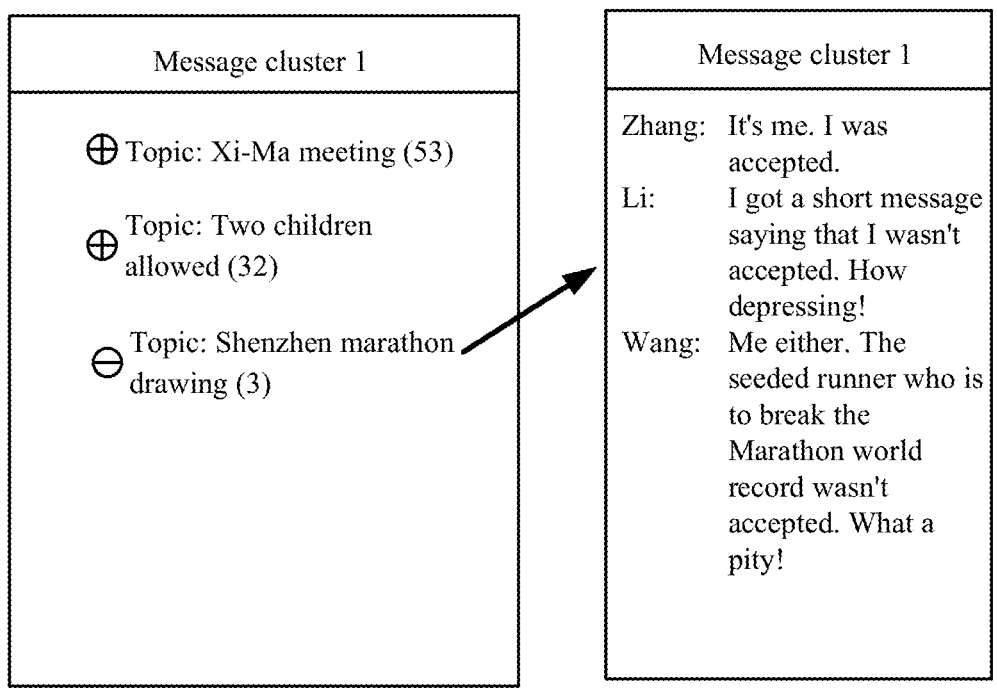

FIG. 4 (b) is used as an example for description. If a selected topic is "Shenzhen marathon drawing", a presenting manner may be shown in FIG. 5(a), FIG. 5(b), or FIG. 5(c).

Specifically, in step 203, the client sends the message presenting request, and the message presenting request further includes a restriction on a presenting request message. The server receives the message presenting request sent by the client. The server sends, to the client for presenting, a message that satisfies the restriction indicated by the message presenting request and that is classified under the target classification topic.

For example, only a message within a preset period of time is presented under the target classification topic, or a message sent by a specified user is presented under the target classification topic.

Messages presented under the target classification topic may be displayed in a chronological order of publication. Colors that message fonts assume under different classification topics may be different or the same. For example, each classification topic is corresponding to one font color.

In the message presenting method in FIG. 2, messages in a cluster are classified by a server. The server can not only classify a local message (a message that has already been presented on the client), but also classify a message that is entered by a user to a client and reported by the client to the server and that has not been displayed on the client.

Figure 6:
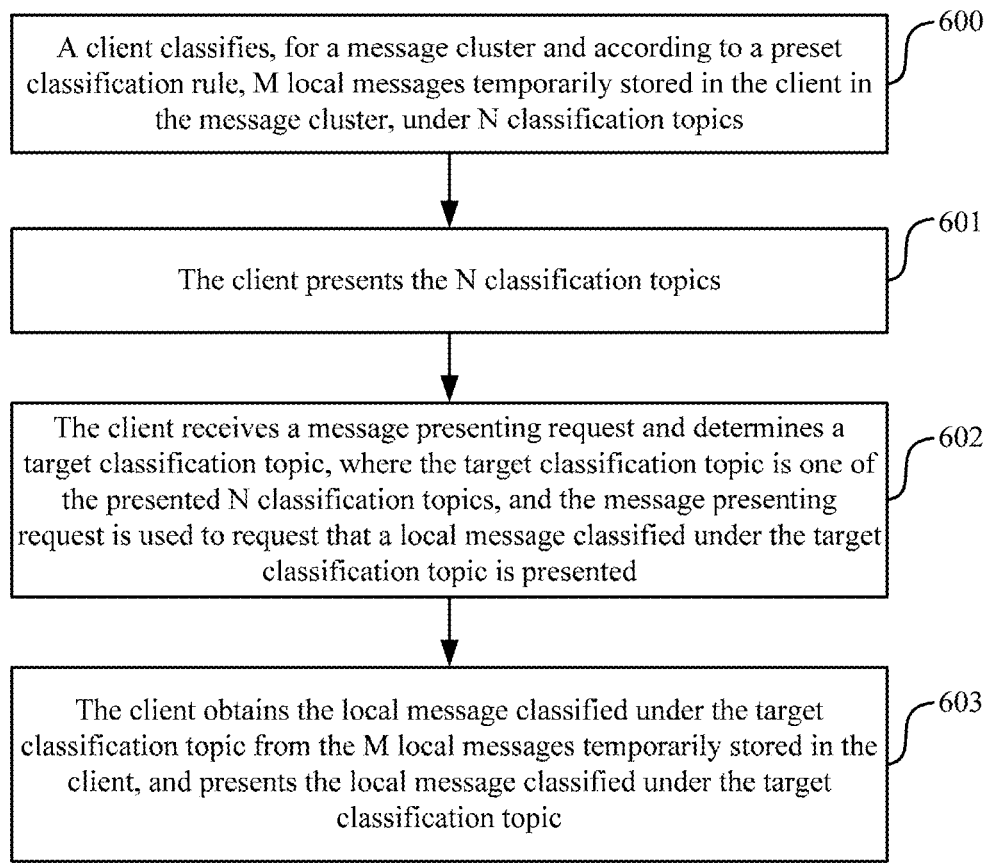
FIG. 6 is a schematic flowchart of a message presenting method according to an embodiment of the present invention.

The message presenting method in this embodiment of the present invention may alternatively be completed by a client independently. When the message presenting method is completed by a client independently, the client can display, by classification, only a local message that has already been presented on the client. Specifically, as shown in FIG. 6, the following steps are included.

Step 600. The client classifies, for a message cluster and according to a preset classification rule, M local messages in the message cluster that are temporarily stored in the client, under N number of classification topics, where M and N are positive integers, and M≥N.

A manner for triggering the client to classify the local messages in the message cluster may be: The client receives a message classification display request for the message cluster; the client determines that a quantity of local messages temporarily stored in the message cluster exceeds a given threshold; or when there is a local message temporarily stored in the message cluster, the client is directly triggered to classify local messages under different classification topics.

Specifically, an optional implementation manner of the classifying, by the client, M local messages in the message cluster under N number of classification topics is: The client determines classification weight values that each of the M local messages is classified under preset K classification topics respectively, where K is a positive integer, and K≥N; divides the M local messages into P number of groups according to a message content classification rule, to obtain P number message groups; and classifies, for the $n^{th}$ message group of the P number message groups, the $n^{th}$ message group under a first classification topic, where a local message having the largest classification weight value in the $n^{th}$ message group is a first message, a classification weight value that the first message is classified under the first classification topic is the largest, and the first classification topic is one of the N number of classification topics, where n is a positive integer less than or equal to P.

It should be noted that in this embodiment of the present invention, the local messages in the message cluster may first be classified to obtain the P number message groups, then a classification weight value that each message is classified under a classification topic is determined, and finally a classification topic under which each message group is classified is determined. A message classification method may alternatively be training a sequence labeling model, and features used in the model may not include that related to the topic classification weight.

Optionally, there are at least two messages having the largest classification weight value in the $n^{th}$ message group, and the first message is an earliest-entered message of the at least two messages.

In the case of implementation by a client, a method for specifically classifying a local message in a message cluster under a classification topic is similar to the method for classifying, by the server, a message in a message cluster under a classification topic. Therefore, for the method for classifying, by the client, a message in a message cluster under a classification topic, refer to the method for classifying, by the server, a message in a message cluster under a classification topic, and details are not further described herein.

Step 601. The client presents the N number of classification topics.

A specific presenting manner of the presenting, by the client, the N number of classification topics is similar to the presenting manner in FIG. 2, and details are not further described herein.

Step 602. The client receives a message presenting request and determines a target classification topic, where the target classification topic is one of the presented N number of classification topics, and the message presenting request is used to request that a local message classified under the target classification topic is presented.

Step 603. The client obtains the local message classified under the target classification topic from the M local messages temporarily stored in the client, and presents the local message classified under the target classification topic.

Specifically, a manner for presenting, by the client, the message classified under the target classification topic may be: displaying a dialog box in correspondence to the target classification topic, and presenting, in the displayed dialog box, the message classified under the target classification topic; or presenting, by the client, the message classified under the target classification topic, in a preset unoccupied region of a dialog box to which the target classification topic belongs.

Specifically, a manner of presenting on the client is similar to the manner of presenting on the client in FIG. 2, and details are not further described herein.

Optionally, in this embodiment of the present invention, a manner for triggering the client to classify the M local messages in the message cluster under the N number of classification topics may include: The client receives a message classification display request for the message cluster; or the client determines that a quantity of local messages temporarily stored in the message cluster exceeds a given threshold.

Before presenting the message classified under the target classification topic, the client receives a message presenting request, and the message presenting request further includes a restriction on a presenting-requested local message. The client obtains, from the M local messages temporarily stored in the client, a local message that satisfies the restriction and that is classified under the target classification topic, and presents the local message that satisfies the restriction and that is classified under the target classification topic.

For example, only a local message within a preset period of time is presented under the target classification topic, or a local message published by a specified user is presented under the target classification topic.

Local messages presented under the target classification topic may be displayed in a chronological order of publication. Colors that message fonts assume under different classification topics may be different or the same. For example, each classification topic is corresponding to one font color.

Based on the same inventive concept, the embodiments of the present invention further provide a message presenting server, client, and system. Methods corresponding to the message presenting server, client, and system are the message presenting methods in the embodiment of the present invention. Therefore, for implementation of the message presenting server, client, and system in the embodiments of the present invention, refer to implementation of the methods, and repetition is avoided.

Figure 7:
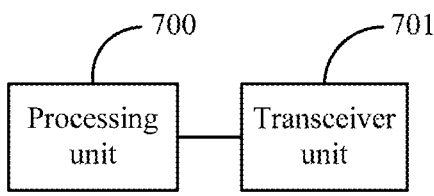
FIG. 7 is a schematic structural diagram of a message presenting server according to an embodiment of the present invention.

As shown in FIG. 7, a message presenting server in an embodiment of the present invention includes a processing unit 700 and a transceiver unit 701. The processing unit 700 is configured to classify, for a message cluster and according to a preset classification rule, M number of messages entered in the message cluster by at least one user, under N number of classification topics, where M and N are positive integers, and M≥N. The transceiver unit 701 is configured to send to a client a target message and the N number of classification topics obtained through classification by the processing unit 700, where the target message is a message classified under at least one of the N number of classification topics.

Optionally, the processing unit 700 is specifically configured to: separately determine classification weight values that each of the M number of messages is classified under preset K classification topics, where K is a positive integer, and K≥N; divide the M number of messages into P number of groups according to a message content classification rule, to obtain P number message groups; and classify, for the $n^{th}$ message group of the P number message groups, the $n^{th}$ message group under a first classification topic, where a message having the largest classification weight value in the $n^{th}$ message group is a first message, a classification weight value that the first message is classified under the first classification topic is the largest, and the first classification topic is one of the N number of classification topics.

Optionally, there are at least two messages having the largest classification weight value in the $n^{th}$ message group, and the first message is an earliest-entered message of the at least two messages.

Optionally, the transceiver unit 701 is further configured to receive a message classification display request sent by the client for the message cluster, before sending the N number of classification topics obtained through classification by the processing unit 700 to the client for presenting. Alternatively, the processing unit 700 is further configured to determine that a quantity of messages entered in the message cluster exceeds a given threshold, before the transceiver unit sends the N number of classification topics obtained through classification by the processing unit 700 to the client for presenting.

Optionally, the target message is messages classified separately under the N number of classification topics. The transceiver unit 701 is specifically configured to send the messages classified separately under the N number of classification topics to the client.

Optionally, the target message is a message classified under a target classification topic, and the target classification topic is a classification topic under which a message that a message presenting request sent by the client to the transceiver unit requests sending is classified. The transceiver unit 701 is specifically configured to: send the message classified under the target classification topic to the client after receiving the message presenting request sent by the client, where the message presenting request is used to request that the processing unit 700 sends the message classified under the target classification topic to the client by using the transceiver unit.

Optionally, the message presenting request further includes a restriction on a presenting request message. The transceiver unit 701 is specifically configured to send to the client a message that satisfies the restriction and that is classified under the target classification topic and determined by the processing unit 700.

Optionally, the transceiver unit 701 is further configured to send a quantity of messages classified under each of the N number of classification topics to the client.

Figure 8:
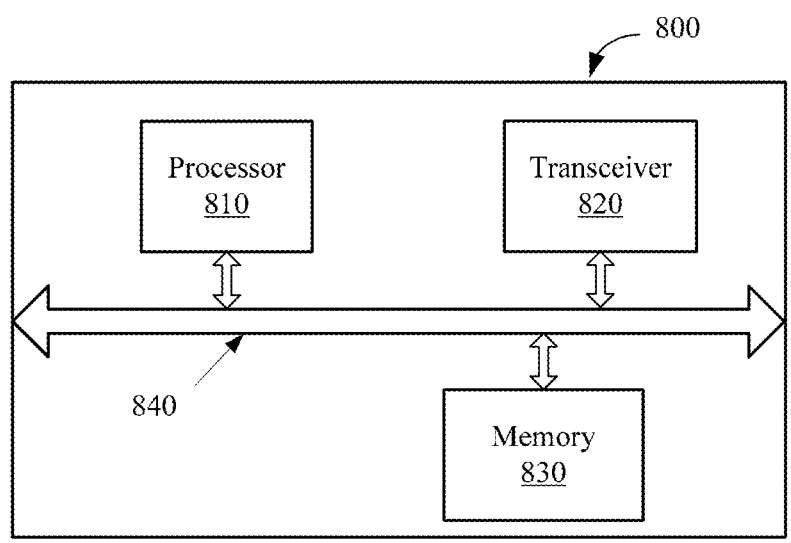
FIG. 8 is a schematic hardware structural diagram of a message presenting server according to an embodiment of the present invention.

It should be noted that in this embodiment of the present invention, the processing unit 700 may be implemented by a processor, and the transceiver unit 701 may be implemented by a transceiver. As shown in FIG. 8, a server 800 in an embodiment of the present invention may include a processor 810, a transceiver 820, and a memory 830. The memory 830 may be configured to store a program/code pre-installed before the server 800 leaves the factory, code used for execution by the processor 810, or the like.

Components of the server 800 are coupled together by using a bus system 840. In addition to a data bus, the bus system 840 further includes a power bus, a control bus, and a state signal bus.

The processor 810 may use a general-purpose central processing unit (CPU), a microprocessor, an application-specific integrated circuit (Application Specific Integrated Circuit, ASIC), or one or more integrated circuits to perform corresponding operations, so as to implement the technical solution provided in the embodiments of the present invention.

It should be noted that, for the server 800 shown in FIG. 8, only the processor 810, the transceiver 820, and the memory 830 are shown. However, in a specific implementation process, persons skilled in the art should understand that the server 800 further includes another device necessary for normal operation. In addition, according to a specific requirement, persons skilled in the art should understand that the server 800 may further include a hardware device that implements another additional function. Moreover, persons skilled in the art should understand that the server 800 may alternatively include only a device or module necessary for implementing the embodiments of the present invention, and not necessarily include all the devices in FIG. 8.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM: Read-Only Memory), a random access memory (RAM: Random Access Memory), or the like.

Figure 9:
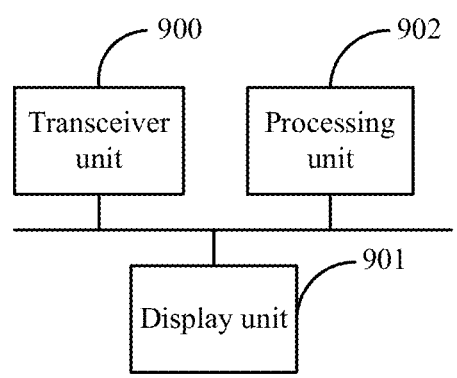
FIG. 9 is a schematic structural diagram of a message presenting client according to an embodiment of the present invention.

As shown in FIG. 9, a message presenting client in an embodiment of the present invention includes a transceiver unit 900, a display unit 901, and a processing unit 902. The transceiver unit 900 is configured to receive N number of classification topics sent by a server with regard to a message cluster, where the N number of classification topics are obtained by the server by classifying M number of messages according to a preset classification rule, M and N are positive integers, and M≥N. The display unit 901 is configured to present the N number of classification topics received by the transceiver unit 900. The transceiver unit 900 is further configured to receive a message presenting request, where the message presenting request is used to request that a message classified under a target classification topic is presented, and the target classification topic is one of the presented N number of classification topics. The processing unit 902 is configured to determine the target classification topic according to the message presenting request received by the transceiver unit 900. The display unit 901 is further configured to obtain and present the message classified under the target classification topic that is determined by the processing unit 902.

Optionally, the transceiver unit 900 is further configured to receive messages classified separately under the N number of classification topics and sent by the server. The display unit 901 is specifically configured to read the message classified under the target classification topic, from the messages classified separately under the N number of classification topics and received by the transceiver unit 900.

Optionally, the message presenting request further includes a restriction on a presenting request message. The display unit 901 is specifically configured to read a message that satisfies the restriction and that is classified under the target classification topic, from the messages classified separately under the N number of classification topics and received by the transceiver unit 900.

Optionally, the transceiver unit 900 is specifically configured to: send the message presenting request to the server, to instruct the server to send the message classified under the target classification topic to the client; and receive the message classified under the target classification topic and sent by the server. The display unit 901 is specifically configured to obtain the message classified under the target classification topic and received by the transceiver unit 900.

Optionally, the message presenting request further includes a restriction on a presenting request message. The transceiver unit 900 is specifically configured to receive a message that satisfies the restriction and that is classified under the target classification topic and sent by the server.

Optionally, the transceiver unit 900 is further configured to send a message classification display request for the message cluster to the server before the display unit presents the N number of classification topics sent by the server for the message cluster.

Optionally, the display unit 901 is specifically configured to: display a dialog box in correspondence to the target classification topic, and present, in the displayed dialog box, the message classified under the target classification topic; or present the message classified under the target classification topic, in a preset unoccupied region of a dialog box to which the target classification topic belongs.

Figure 10:
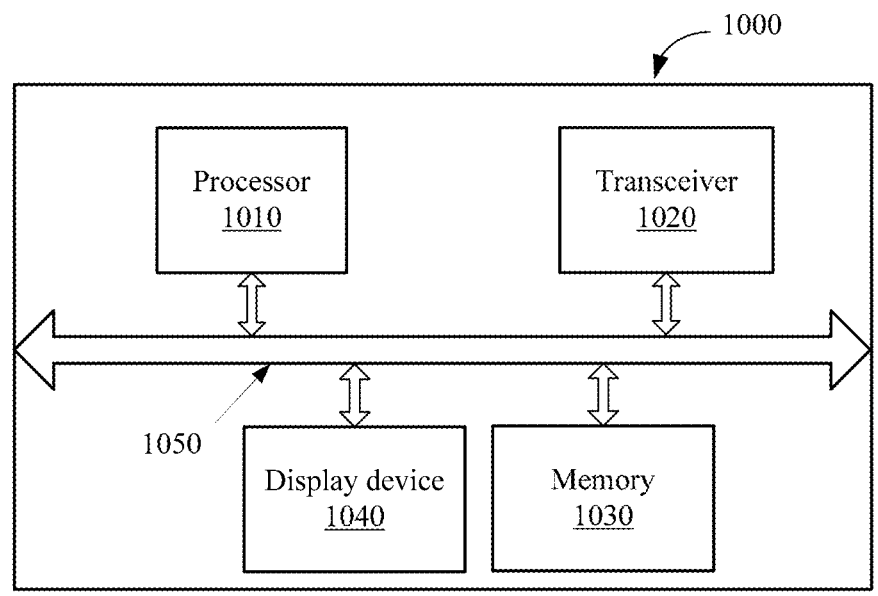
FIG. 10 is a schematic hardware structural diagram of a message presenting client according to an embodiment of the present invention.

It should be noted that in this embodiment of the present invention, the processing unit 902 may be implemented by a processor, the transceiver unit 900 may be implemented by a transceiver, and the display unit 901 may be implemented by a display device. As shown in FIG. 10, a client 1000 in an embodiment of the present invention may include a processor 1010, a transceiver 1020, a memory 1030, and a display device 1040. The memory 1030 may be configured to store a program/code pre-installed before the client 1000 leaves the factory, code used for execution by the processor 1010, or the like.

Components of the client 1000 are coupled together by using a bus system 1050. In addition to a data bus, the bus system 1050 further includes a power bus, a control bus, and a state signal bus.

The processor 1010 may use a general-purpose central processing unit (Central Processing Unit, CPU), a microprocessor, an application-specific integrated circuit (Application Specific Integrated Circuit, ASIC), or one or more integrated circuits to perform corresponding operations, so as to implement the technical solution provided in the embodiments of the present invention.

It should be noted that, for the client 1000 shown in FIG. 10, only the processor 1010, the transceiver 1020, the memory 1030, and the display device 1040 are shown. However, in a specific implementation process, persons skilled in the art should understand that the client 1000 further includes another device necessary for normal operation. In addition, according to a specific requirement, persons skilled in the art should understand that the client 1000 may further include a hardware device that implements another additional function. Moreover, persons skilled in the art should understand that the client 1000 may alternatively include only a device or module necessary for implementing the embodiments of the present invention, and not necessarily include all the devices in FIG. 10.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM: Read-Only Memory), a random access memory (RAM: Random Access Memory), or the like.

Figure 11:
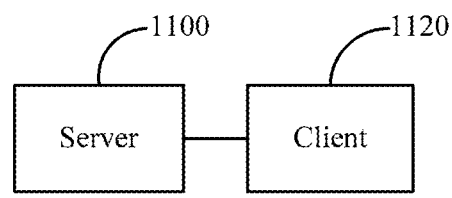
FIG. 11 is a schematic structural diagram of a message presenting system according to an embodiment of the present invention.

As shown in FIG. 11, a message presenting system in an embodiment of the present invention includes any server 1100 provided in the embodiments of the present invention and any client 1120 provided in the embodiments of the present invention.

Figure 12:
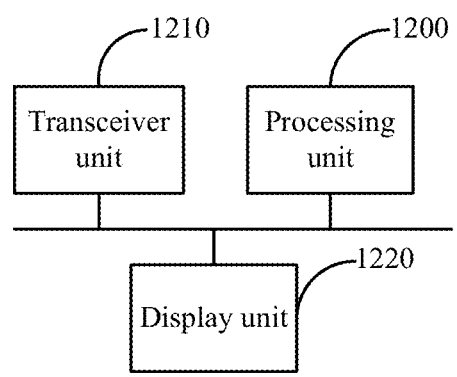
FIG. 12 is a schematic structural diagram of a message presenting client according to an embodiment of the present invention.

As shown in FIG. 12, a message presenting client according to an embodiment of the present invention includes a processing unit 1200, a transceiver unit 1210, and a display unit 1220. The processing unit 1200 is configured to classify, for a message cluster and according to a preset classification rule, M local messages temporarily stored in the message cluster, under N number of classification topics, where M and N are positive integers, and M≥N. The display unit 1220 is configured to present the N number of classification topics obtained through classification by the processing unit. The transceiver unit 1210 is configured to receive a message presenting request, where the message presenting request is used to request that a local message classified under a target classification topic is presented, and the target classification topic is one of the presented N number of classification topics. The processing unit 1200 is further configured to determine the target classification topic according to the message presenting request received by the transceiver unit. The display unit 1220 is further configured to: obtain the local message classified under the target classification topic from the M temporarily-stored local messages, and present the local message classified under the target classification topic.

Optionally, the transceiver unit 1210 is further configured to receive a message classification display request for the message cluster before the processing unit 1200 classifies the M local messages in the message cluster under the N number of classification topics. Alternatively, the processing unit 1200 is further configured to determine that a quantity of local messages temporarily stored in the message cluster exceeds a given threshold, before classifying the M local messages in the message cluster under the N number of classification topics.

Optionally, the processing unit 1200 is specifically configured to: determine classification weight values that each of the M local messages is classified under preset K classification topics respectively, where K is a positive integer, and K≥N; divide the M number of messages into P number of groups according to a message content classification rule, to obtain P number message groups; and classify, for the $n^{th}$ message group of the P number message groups, the $n^{th}$ message group under a first classification topic, where a message having the largest classification weight value in the $n^{th}$ message group is a first message, a classification weight value that the first message is classified under the first classification topic is the largest, and the first classification topic is one of the N number of classification topics.

Optionally, there are at least two messages having the largest classification weight value in the $n^{th}$ message group, and the first message is an earliest-entered message of the at least two messages.

Optionally, the display unit 1220 is specifically configured to: display a dialog box in correspondence to the target classification topic, and present, in the displayed dialog box, the local message classified under the target classification topic; or present the local message classified under the target classification topic, in a preset unoccupied region of a dialog box to which the target classification topic belongs.

Optionally, the message presenting request further includes a restriction on a presenting-requested local message. The display unit 1220 is specifically configured to: obtain, from the M local messages temporarily stored in the client, a local message that satisfies the restriction and that is classified under the target classification topic, and present the local message that satisfies the restriction and that is classified under the target classification topic.

Figure 13:
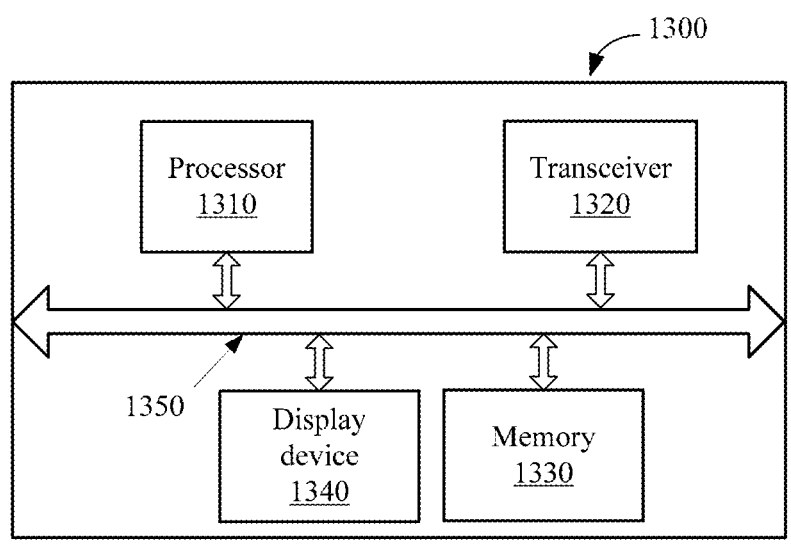
FIG. 13 is a schematic hardware structural diagram of a message presenting client according to an embodiment of the present invention.

It should be noted that in this embodiment of the present invention, the processing unit 1200 may be implemented by a processor, the transceiver unit 1210 may be implemented by a transceiver, and the display unit 1220 may be implemented by a display device. As shown in FIG. 13, a client 1300 in an embodiment of the present invention may include a processor 1310, a transceiver 1320, a memory 1330, and a display device 1340. The memory 1330 may be configured to store a program/code pre-installed before the client 1300 leaves the factory, code used for execution by the processor 1310, or the like.

Components of the client 1300 are coupled together by using a bus system 1350. In addition to a data bus, the bus system 1350 further includes a power bus, a control bus, and a state signal bus.

The processor 1310 may use a general-purpose central processing unit (Central Processing Unit, CPU), a microprocessor, an application-specific integrated circuit (Application Specific Integrated Circuit, ASIC), or one or more integrated circuits to perform corresponding operations, so as to implement the technical solution provided in the embodiments of the present invention.

It should be noted that, for the client 1300 shown in FIG. 13, only the processor 1310, the transceiver 1320, the memory 1330, and the display device 1340 are shown. However, in a specific implementation process, persons skilled in the art should understand that the client 1300 further includes another device necessary for normal operation. In addition, according to a specific requirement, persons skilled in the art should understand that the client 1300 may further include a hardware device that implements another additional function. Moreover, persons skilled in the art should understand that the client 1300 may alternatively include only a device or module necessary for implementing the embodiments of the present invention, and not necessarily include all the devices in FIG. 13.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM: Read-Only Memory), a random access memory (RAM: Random Access Memory), or the like.

It can be seen from the foregoing content that in the embodiments of the present invention, a server classifies, for a message cluster and according to a preset classification rule, M number of messages entered in the message cluster by at least one user, under N number of classification topics, and sends the N number of classification topics and a target message to a client, where the target message is a message classified under at least one of the N number of classification topics. In the technical solution, with regard to a message cluster, M number of messages entered in the message cluster by at least one user can be classified under N number of classification topics according to a preset classification rule, and the N number of classification topics and a target message can be sent to a client, so that the client can present the N number of classification topics to a user. This diversifies the message presenting manner, and enables the user to directly perceive a full picture of content of messages discussed in the message cluster.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A message presenting method, comprising:
classifying, by a server for a message cluster and according to a preset classification rule, M number of messages entered in the message cluster by at least one user, under N number of classification topics, wherein M and N are positive integers, and M≥N;
sending, by the server, the N number of classification topics to a client;
receiving, by the server, from the client, a user selected classification topic, the user selected classification topic being a classification topic among the N number of classification topics;

determining, by the server, a target message according to the user selected classification topic; and sending, by the server, the target message to the client;

wherein classifying, by the server according to the preset classification rule, the M number of messages under the N number of classification topics comprises;

determining, by the server, a feature vector for each of the M number of messages, wherein the feature vector indicates one or more features are present in the message;

determining, by the server, a classification weight value for each of the M number of messages according to the feature vector under preset K classification topics, wherein K is a positive integer, and K≥N;

dividing, by the server, the M number of messages into P number of groups according to a message content classification rule, to obtain P number message groups; and classifying, by the server for an $n^{th}$ message group of the P number message groups, the $n^{th}$ message group under a first classification topic, wherein a message having the largest classification weight value in the $n^{th}$ message group is a first message, a classification weight value the first message is classified under the first classification topic is the largest, and the first classification topic is one of the N number of classification topics, wherein n is smaller or equal to P.

2. The method according to claim 1, wherein there are at least two messages having the largest classification weight value in the $n^{th}$ message group, and the first message is an earliest-entered message of the at least two messages.

3. The method according to claim 1, before the sending, by the server, the N number of classification topics to a client, comprising:

receiving, by the server, a message classification display request sent by the client for the message cluster; or determining, by the server, a quantity of messages entered in the message cluster exceeds a given threshold.

4. The method according to claim 1, further comprising a request from the client, wherein the request comprises a restriction; and, wherein determining, by the server, the target message according to the user selected classification topic comprises:

determining, by the server, a message that satisfies the restriction and is classified under a target classification topic as the target message.

5. A message presenting method, comprising:

receiving and presenting, by a client, N number of classification topics sent by a server for a message cluster, wherein the N number of classification topics are obtained by the server by classifying M number of messages according to a preset classification rule, wherein M and N are positive integers, and M≥N;

receiving, by the client, a message presenting request for presenting a message classified under a classification topic;

receiving, by the client, a target classification topic selected by a user from the presented N number of classification topics;

receiving, by the client, from the server, a target message for presentation, wherein the target message is determined by the server according to the user selected target classification topic; and presenting, by the client, the target message;

wherein classifying, by the server according to the preset classification rule, the M number of messages comprises:

determining, by the server, a feature vector for each of the M number of messages, wherein the feature vector indicates one or more features are present in the message;

determining, by the server, a classification weight value for each of the M number of messages according to the feature vector under preset K classification topics, wherein K is a positive integer, and K≥N;

dividing, by the server, the M number of messages into P number of groups according to a message content classification rule, to obtain P number message groups; and classifying, by the server for an $n^{th}$ message group of the P number message groups, the $n^{th}$ message group under a first classification topic, wherein a message having the largest classification weight value in the $n^{th}$ message group is a first message, a classification weight value the first message is classified under the first classification topic is the largest, and the first classification topic is one of the N number of classification topics, wherein n is smaller or equal to P.

6. The method according to claim 5, wherein the presenting, by the client, the target message comprises:

displaying, by the client, a dialog box in correspondence to the target classification topic, and presenting, in the displayed dialog box, the target message classified under the target classification topic; or presenting, by the client, the target message classified under the target classification topic, in a preset unoccupied region of a dialog box to which the target classification topic belongs.

7. A message presenting server, comprising a processor, a memory and a transceiver, wherein the processor is configured to execute machine-readable instructions stored in the memory to classify, for a message cluster and according to a preset classification rule, M number of messages entered in the message cluster by at least one user, under N number of classification topics, wherein M and N are positive integers, and M≥N; and, the transceiver is configured to send to a client the N number of classification topics; and, wherein the processor is further configured to determine a target message according to a user selected classification topic; and the transceiver is further configured to send the target message to the client;

wherein the processor is further configured to:

determine a feature vector for each of the M number of messages, wherein the feature vector indicates one or more features are present in the message;

determine a classification weight value for each of the M number of messages according to the feature vector under preset K classification topics, wherein K is a positive integer, and K≥N;

divide the M number of messages into P number of groups according to a message content classification rule, to obtain P number message groups; and classify for an $n^{th}$ message group under a first classification topic, wherein a message having the largest classification weight value in the $n^{th}$ message group is a first message, a classification weight value the first message is classified under the first classification topic is the largest, and the first classification topic is one of the N number of classification topics, wherein n is smaller or equal to P.

8. The server according to claim 7, wherein there are at least two messages having the largest classification weight value in the $n^{th}$ message group, and the first message is an earliest-entered message of the at least two messages.

9. The server according to claim 7, wherein the transceiver is further configured to:
receive a message classification display request sent by the client for the message cluster, before sending the N number of classification topics obtained through classification by the processor to the client for presenting; or
the processor is further configured to:
determine a quantity of messages entered in the message cluster exceeds a given threshold, before the transceiver sends the N number of classification topics obtained through classification by the processor to the client for presenting.

10. A message presenting client, comprising a processor, a memory a transceiver, and a display unit, wherein
the transceiver is configured to receive N number of classification topics sent by a server for a message cluster, wherein the N number of classification topics are obtained by the server by classifying M number of messages according to a preset classification rule, M and N are positive integers, and M≥N; and
the display unit is configured to present the N number of classification topics; and, wherein
the transceiver is further configured to receive a message presenting request for presenting a message classified under a classification topic;
the processor is configured to execute machine readable instructions stored in the memory to:
receive a target classification topic selected by a user from the presented N number of classification topics;
the transceiver is configured to receive from the server a target message for presentation, wherein the target message is determined by the server according to the user selected target classification topic; and
the display unit is further configured to present the target message;
wherein classifying, by the server according to the preset classification rule, the M number of messages comprises:
determining, by the server, a feature vector for each of the M number of messages, wherein the feature vector indicates one or more features are present in the message;
determining, by the server, a classification weight value for each of the M number of messages according to the feature vector under preset K classification topics, wherein K is a positive integer, and K≥N;
dividing, by the server, the M number of messages into P number of groups according to a message content classification rule, to obtain P number message groups; and
classifying, by the server for an $n^{th}$ message group of the P number message groups, the $n^{th}$ message group under a first classification topic, wherein a message having the largest classification weight value in the $n^{th}$ message group is a first message, a classification weight value the first message is classified under the first classification topic is the largest, and the first classification topic is one of the N number of classification topics, wherein n is smaller or equal to P.

11. The client according to claim 10, wherein the display unit is configured to:
display a dialog box in correspondence to the target classification topic, and present, in the displayed dialog box, the message classified under the target classification topic; or present the message classified under the target classification topic, in a preset unoccupied region of a dialog box to which the target classification topic belongs.

* * * * *